INVENTOR.
RALPH P. CRAIG
BY C. G. Stratton
ATTORNEY

March 31, 1959 R. P. CRAIG 2,879,810
ENCAPSULATING APPARATUS
Filed March 12, 1956 2 Sheets-Sheet 2
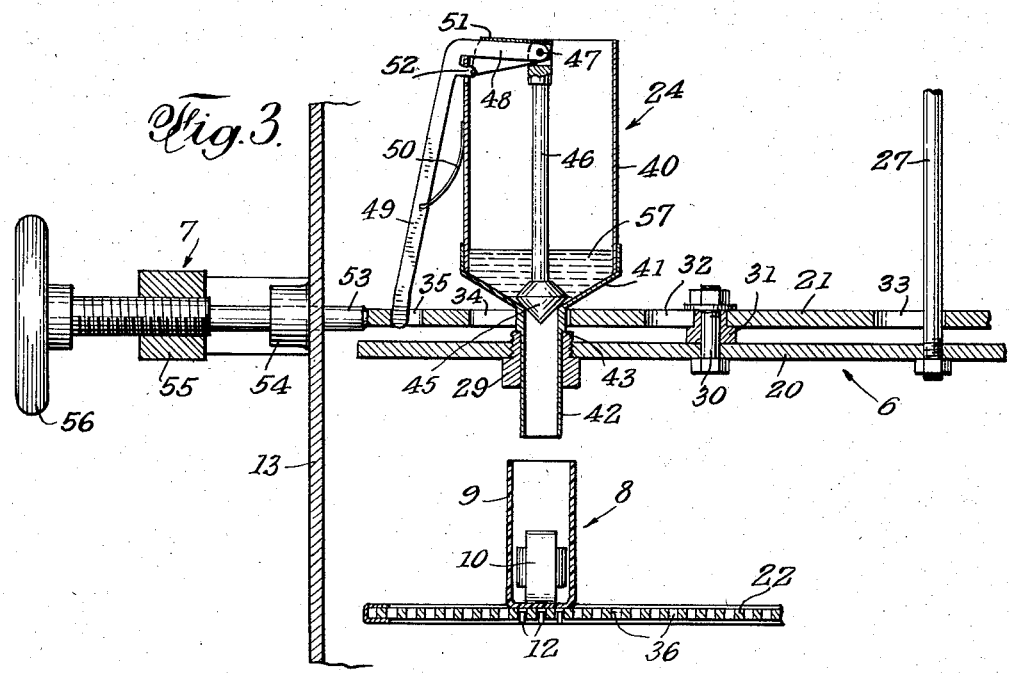
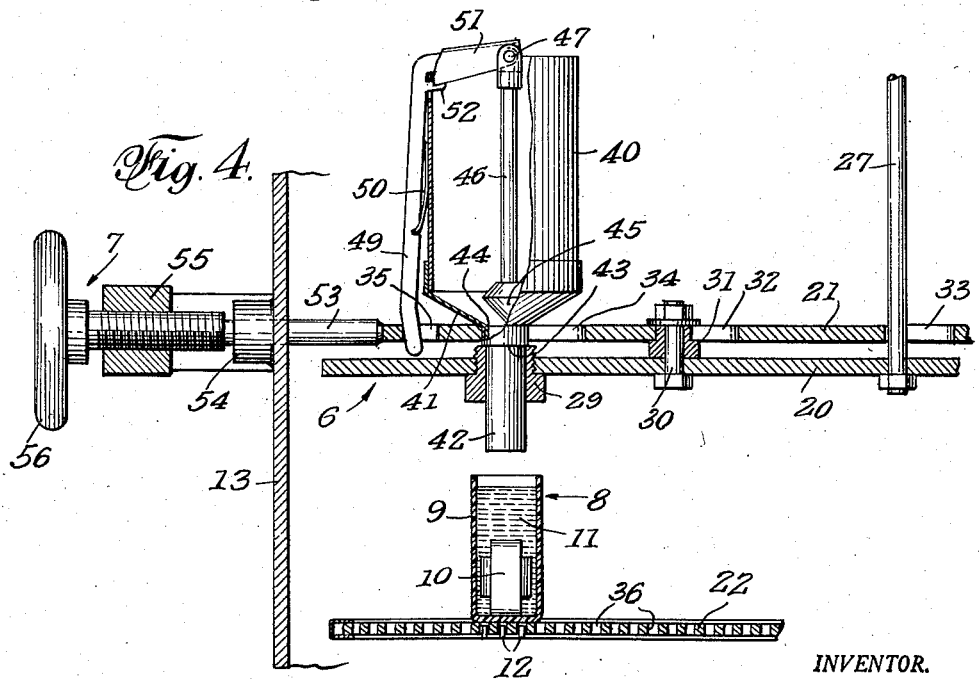
INVENTOR.
RALPH P. CRAIG
BY C. H. Stratton
ATTORNEY

United States Patent Office 2,879,810
Patented Mar. 31, 1959

2,879,810

ENCAPSULATING APPARATUS

Ralph P. Craig, Los Angeles, Calif., assignor, by mesne assignments, to Red Point Corporation, Glendale, Calif., a corporation of California Application March 12, 1956, Serial No. 570,925

13 Claims. (Cl. 141—51)

This invention relates to apparatus for encapsulating units, such as electronic elements or components. The technique of encapsulation entails the provision of a housing or container, placing an element therein, filling the container under vacuum to completely cover the element with a liquid material that becomes hardened and then, optionally, cutting away any excess portion of container and hardened material.

The containers may be made of any suitable metal or plastic composition, depending on the type of element to be encapsulated therein. Electronic elements, ordinarily, would be sealed into plastic containers which may be provided with terminal prongs to which the elements are internally connected. The liquid hardening material may be an epoxy resin or any other plastic material that has good impregnating or potting properties. Such resins, provided with suitable hardeners and often reinforced with glass powder or similar materials, may be used to effect suitable bonding to the material of the container.

Encapsulated electronic assemblies should be so produced as to provide permanent protection for the element therein against changes in humidity and temperature, against fungi and fungus growths, and against shock and vibration. Further, such capsules should have high dielectric strength. Hence, it is important that the interiors of the capsules, as well as the element therein, should initially be moisture-free and the sealing material be so applied as to insure total removal of air from around the element and hermetic sealing of the element. Air evacuation from the encapsulating material before being placed in the capsule will insure achievement of the foregoing.

Accordingly, an object of the present invention is to provide novel and improved apparatus to carry out encapsulating in the manner above referred to.

Another object of the invention is to provide a simple apparatus wholly operable in an air-exhausted atmosphere and, in a simple manner, effective to encapsulate as above described.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, one embodiment of the present invention, which is given by way of illustration or example only.

In the drawings, like reference characters designate similar parts in the several views.

Fig. 3 is an enlarged sectional view as taken on line 3—3 of Fig. 2 showing the encapsulating means before release of the encapsulating material.

Fig. 4 is a similar view showing the means of Fig. 3 in the position assumed upon release of the encapsulating material.

Figure 1:
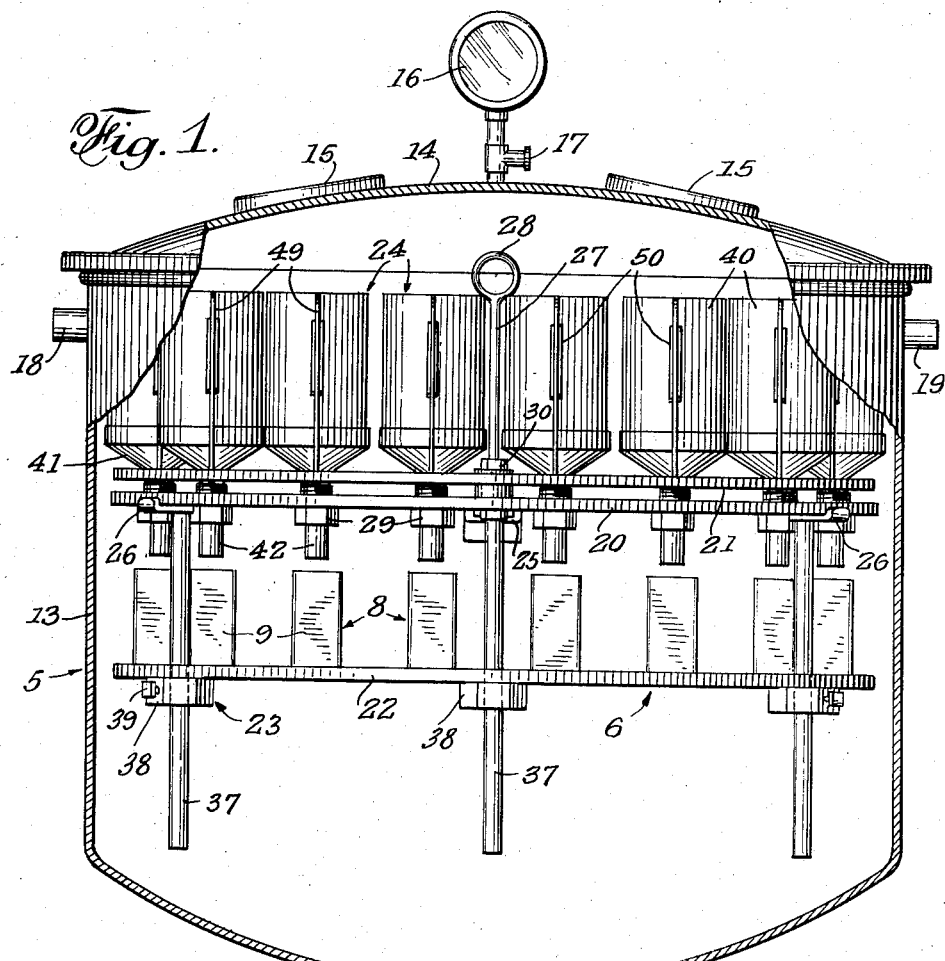
Fig. 1 is a vertical sectional view of a sealed vessel showing encapsulating means disposed in the interior thereof.

The apparatus that is illustrated comprises, generally, a tank 5, encapsulating means 6 removably disposed in said tank, and means 7 for operating the means 6 from outside the tank.

The above generally described apparatus is provided for producing the unit 8 (Fig. 4), the same comprising an open-topped container 9, an element 10 therewithin, and a quantity of resin material 11 in the container and hermetically sealing around the element 10. In this instance, the container of said unit 8 is shown as provided with terminals or prongs 12 which extend outward of the container and are in electrical connection with element 10. Thus, although the latter is sealed in material 11, the same may be connected in an electric circuit by means of the prongs 12.

The tank 5 comprises a body 13 that is preferably open-topped and is provided with a sealing lid 14. The latter may be provided with windows 15 enabling inspection of the tank interior, a pressure gauge 16 to advise of the pressure condition within the tank, and a vacuum bleeder 17, as desired. The tank body is shown as provided with a pressure inlet connection 18 and with a vacuum connection 19, the same being connected to suitable sources of pressure and vacuum in the usual manner.

The encapsulating means 6 comprises a base plate 20, a relatively shiftable plate 21 above and in parallel relation to plate 20, a unit-supporting plate 22 beneath and parallel to said base plate 20, means 23 adjustably interconnecting plates 20 and 22 for movement of the latter toward and from the former, and a set of material-holding and -discharging devices 24 carried by plate 20 and operatively connected to be operated by shifting movement of plate 21, said devices discharging material into containers 9 supported by plate 22 and in respective vertical alignment or register with the devices 24.

The plate 20 loosely fits the interior of the tank and the same may be supported in transverse position, as shown, as by means of brackets 25 affixed to the interior of the tank body and engaged by radial lugs or extensions 26 provided on or affixed to said plate 20. A rod 27 may extend upwardly from the center of said plate and may be provided with a loop or eye 28 by means of which the plate 20 and all parts carried thereby may be removed from or introduced into the interior of the tank. In suitable clearance arrangement, the plate 20 is provided with a plurality of support bushings 29 that constitute elements on which the units 24 are supported.

Figure 2:
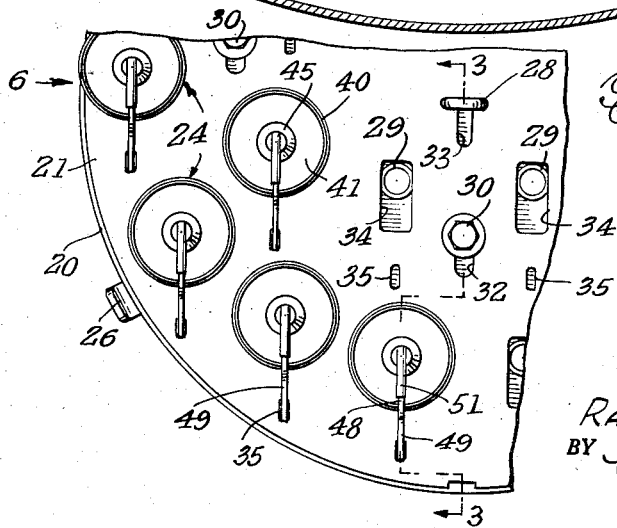
Fig. 2 is a fragmentary plan view of said encapsulating means.

The plate 21 may be slightly smaller, diametrally, than plate 20, since the same is shiftable, and may be so moved without encountering the inner face of the tank. Plates 20 and 21 are connected by a set of studs 30 and a set of shoulder bushings 31 strung on said studs, the latter bushings being operable in elongated openings or slots 32 formed in plate 21. Said bushings 31 serve to space plates 20 and 21 and the slots 32 serve to limit the shifting movement of the plate 21. Accordingly, a slot 33 is provided in said plate 21 to accommodate rod 27, as well as a set of slots 34 associated with the respective bushings 29. Plate 21 is further provided with a set of smaller slots 35—one for each slot 34, as best seen in Fig. 2.

The plate 22 is shown as provided with a multiplicity of perforations 36, the same serving to accommodate the prongs 12 of units 8, as indicated in Figs. 3 and 4. Since accurate alignment of said units and the devices 24 is not necessary, such perforations 36 may be provided in an overall arrangement or pattern and yet so receive prongs 12 as to properly locate containers 9 beneath devices 24.

The means 23 is shown in Fig. 1 as comprising a set of guide rods 37 extending downwardly from base plate 20, said rods being affixed to said plate at or adjacent the peripheral edge thereof. Said rods pass through suitable openings provided in plate 22 and the latter, aligned with said openings, is provided with guide blocks 38 through which the rods extend. Thus, plate 22 may be adjusted, along rods 37, toward and from plate 20 and the adjustment may be locked by set screws 39 carried by blocks 38. The height of containers 9 will determine the above-described adjustment so that deposit of material thereinto may be made without spillage.

The devices 24 are all alike and each comprises a cup 40 that has a preferably conical bottom 41 that extends downwardly as a short tube or spout 42. The latter is adapted to be freely fitted into one of the bushings 29 and a shoulder 43 on said spout engages the top of the bushing to hold the cup vertically positioned.

Where the conical bottom 41 and spout 42 join, the interior of the cup defines a valve seat 44, the device including a conical valve 45 that normally rests on said seat to form a closure for the cup. Said valve is carried on the end of a vertical stem 46 that is connected by a pivot 47 on the end of an arm 48 that is separably engaged with the cup near its upper end and has an integrally connected actuating extension 49 disposed alongside of the cup. A leaf spring 50 normally biases extension 49 in a direction to move arm 48 downwardly and thus press valve 45 on its seat 44.

The mentioned connection of arm 48 with the cup is maintained by a member 51 that is connected on pivot 47 and is swingable into coextensive position with said arm so its free end is adjacent to the inside of the cup. The element comprising arm 48 and integral extension 49 includes an integral finger 52 that extends in pivotal engagement into a hole in the cup and is retained in said opening by the member 51. By swinging member 51 on its pivot and out of coextension with arm 48, said finger 52 may be withdrawn from the hole in the cup and the valve 45 and its stem 46 may be removed from the cup to facilitate cleaning of the parts.

The free ends of extensions 49 reside in slots 35 when the devices 24 are in their positions supported by bushings 29. Leaf springs 50 urge the extensions 49 outward and thus bias the valves 45 in seating direction.

The encapsulating means 6, above described, may be operated from the outside of tank 5, when the latter is closed, by the means 7 which is here shown as a stem 53 extending through a sealing sleeve 54 provided in the wall of tank body 13 and having edgewise engagement with shiftable plate 21 (Figs. 3 and 4). A bridge 55 threadedly engages said stem and the latter is provided with a hand wheel 56 by means of which the stem may be projected and retracted. Said means 7 is so located with respect to plate 21 as to move the latter as limited by the slots 32, 33 and 34 therein.

*Operation*

The encapsulating means 6 is removed from the tank and, after adjusting plate 22 according to the heights of containers 9, the latter are placed on said plate 22 to be in register with the bushings 29 thereabove. Of course, these containers had been initially provided with an element 10 and connection made between said element and prongs 12.

The devices 24 are then mounted on the bushings 29 with the actuating extensions 49 thereof engaged or extending into the respective slots 35. The valves 45 are seated. Hence, the cups 40 may be filled with a pre-measured amount of a free-flowing material, such as the epoxy resin above mentioned.

Now, by means of ring 28, the means 6 is deposited in tank body 13 with the extensions or lugs 26 resting upon brackets 25 (Fig. 1) and the plate 21 properly oriented with relation to the means 7, as above indicated.

After the lid 14 is closed over the tank body and properly fastened down, a vacuum is drawn in the interior of the tank from a source connected to connection 19. When the gauge 16 shows that a sufficiently high vacuum has been achieved to rid the interior of moisture and air occlusion in the units 8 and also in the material 57 in the cups 40, the means 7 is operated to cause shifting of plate 21 from the position of Fig. 3 to that of Fig. 4.

Since the cups do not shift, the valves 45 are lifted from their seats and the contents 57 of the cups are deposited through spouts 42 into the containers of units 8. The above, taking place under vacuum, there can be no air occlusion or moisture entrapment in the interior of container 9. Hence, the element 10 in said container is completely enclosed with a material (resin) that has little or no aeration. The windows 15 may be used to inspect the cups to apprise that the same have been emptied.

Now, the hand wheel 56 of the means 7 is retracted, allowing springs 50 to return to unflexed condition and, in the process, re-shift plate 21 back to its initial position. The valves 45, therefore, return to cup-closing position to obviate dripping from the cups.

Now, the bleeder 17 may be opened to destroy the vacuum in the tank, the lid removed, and the means 6 removed from the tank for replacement of new units 8 for the filled units and replenishment of material to the cups 40. As an alternative, after the vacuum has been bled, pressurized gas may be introduced into the tank through connection 18, if such is needed in the encapsulating process.

After the resin material 11 in units 8 has been cured or hardened by any of the well-known methods, the same may be put into use or the excess ends thereof may be cut off, the cuts passing through the hardened resin 11 safely above the elements 10 that are embedded.

It will be realized that the units 8 may be differently formed and may be provided with temporary mounting means other than the prongs 12 or the like. In any case, whatever projections are provided in or on the containers 9 may serve to locate the latter on unit-supporting plate 22 in suitable register with the devices 24.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described my invention, what I claim and desire to secure by Letters Patent is:

1. In combination, a support with a plurality of locations for supporting containers, a plurality of cups having discharge spouts, means for removably supporting the cups in positions with each of the discharge spouts above one of said container-supporting locations, a removable valve actuator assembly for each of said cups, each comprising a valve having an upwardly extending stem for controlling flow from the spout of the cup, an actuator arm adapted to project from the cup with an inner end pivotally connected to the upper end of the valve stem, an elbow removably pivotally connected to the cup, and an operating arm extending downwardly from said elbow along the side of the cup, and a horizontally movable common control member for said valve actuators having a plurality of openings, each removably receiving the lower end of one of said valve actuator operating arms for enabling the contents of the cups to be discharged simultaneously.

2. Encapsulating apparatus comprising, in combination, a sealed enclosure, a support plate removably disposed within the enclosure and adapted to carry a plurality of liquid-receiving containers, a plurality of liquid-holding and bottom-discharging devices disposed within the enclosure, each said device including a normally-closed liquid-releasing valve and an outer controller for said valve, a second plate connected to and spaced above the support plate and removably mounting said devices in filling register with the containers carried by the support plate, a laterally shiftable member carried by the second plate and provided with openings through which the liquid-holding devices extend and engaged with the mentioned valve controllers, and means carried by the enclosure and extending thereinto to shift said shiftable member to actuate the valve controllers and open the mentioned valves while the closure remains closed.

3. Encapsulating apparatus comprising, in combination, an enclosure comprising a top-open vessel and removable sealing cover and capable, when closed, of being selectively placed under vacuum or pressure, as desired, removable means disposed within the enclosure and including a shiftable member, adjustable means carried by the removable means for supporting a plurality of encapsulatable units, a plurality of devices separably carried by the removable means and each adapted to be filled with a quantity of hardenable liquid material, means outside the enclosure and having an actuator extending therethrough into engagement with the shiftable member for shifting the latter, and an operative engagement between said shiftable member and each said device to release the liquid material therein upon shifting movement of the shiftable member, said device being so vertically aligned with the mentioned units that the released material will gravitationally fall into said units.

4. Encapsulating apparatus according to claim 3: the means outside the enclosure being carried by the enclosure.

5. Encapsulating apparatus according to claim 3: the removable means being provided with means adapted to be engaged to lift said means out of the enclosure, when the latter is open.

6. In encapsulating apparatus, a fixed member, a liquid-containing device removably carried by said member and adapted to discharge liquid gravitationally, a member movably connected to the fixed member, said device being provided with an actuator operatively connected to the movable member, and a vertically movable valve in the device with an upwardly extending control rod controlled by said actuator during shifting movement of the shiftable member.

7. In encapsulating apparatus according to claim 6: a third member adjustably carried relative to the first member and adapted to support a liquid-receiving container in vertical register with the discharge end of the device.

8. In apparatus of the character described, a cup having a discharge spout, a side wall with an opening near the top, a valve controlling flow from said spout, and means having a finger engageable with said opening separably connecting said valve and cup.

9. In apparatus according to claim 8: an extension of the latter means outside the cup and adapted to be actuated to open said valve.

10. In combination, a cup having a discharge spout and a side wall with top edge and a removable valve actuator assembly comprising a valve having an upwardly extending stem for controlling flow from said spout, an actuator arm adapted to project from said cup, with an inner end pivotally connected to the upper end of the valve stem, and means for removably connecting the actuator arm pivotally at the top edge of the cup side wall.

11. Apparatus as in claim 10 in which the side wall of the cup is formed with an opening near the top edge, and the actuator arm is formed with a finger insertable in said opening for accomplishing the removable connection of the actuator arm to the cup side wall.

12. Apparatus as in claim 11 wherein the actuator arm is provided with a locking member pivotally connected to the inner end of the actuator arm and extending toward the cup side wall for engaging the inner surface of the cup side wall to retain said finger in said cup wall opening.

13. Apparatus as in claim 12 wherein the actuator arm has an extension downward along the cup side wall, and a leaf spring secured to said extension is provided for bearing against the cup side wall, and resiliently biasing the extension away from the cup side wall to bias the valve to a position closing the spout.

References Cited in the file of this patent

UNITED STATES PATENTS

| | | |
|---|---|---|
| 1,025,717 | Phelps | May 7, 1912 |
| 1,246,180 | Taylor | Nov. 13, 1917 |
| 1,285,206 | Johnson et al. | Nov. 19, 1918 |
| 1,949,580 | Pierce | Mar. 6, 1934 |
| 2,169,779 | Loewe | Aug. 15, 1939 |
| 2,335,192 | Moore | Nov. 23, 1943 |
| 2,544,416 | Emery et al. | Mar. 6, 1951 |
| 2,588,206 | Clark | Mar. 4, 1952 |